United States Patent
Egg

(10) Patent No.: US 10,382,145 B2
(45) Date of Patent: Aug. 13, 2019

(54) SYSTEM AND METHOD FOR IMPROVING WIRELESS DATA LINKS

(71) Applicant: Benjamin J. Egg, Manti, UT (US)

(72) Inventor: Benjamin J. Egg, Manti, UT (US)

(73) Assignee: Benjamin J. Egg, Manti, UT (US)

( * ) Notice: Subject to any disclaimer, the term of this patent is extended or adjusted under 35 U.S.C. 154(b) by 0 days.

(21) Appl. No.: 16/035,581

(22) Filed: Jul. 13, 2018

(65) Prior Publication Data

US 2019/0140748 A1 May 9, 2019

Related U.S. Application Data

(60) Provisional application No. 62/531,881, filed on Jul. 13, 2017.

(51) Int. Cl.
| | |
|---|---|
| *H04B 15/00* | (2006.01) |
| *H04B 1/40* | (2015.01) |
| *G06F 21/60* | (2013.01) |

(52) U.S. Cl.
CPC ........... *H04B 15/00* (2013.01); *G06F 21/602* (2013.01); *H04B 1/40* (2013.01)

(58) Field of Classification Search
CPC .................................................. H04L 1/0618
See application file for complete search history.

(56) References Cited

U.S. PATENT DOCUMENTS

| | | | | |
|---|---|---|---|---|
| 3,504,199 A | * | 3/1970 | Cooperman | H03K 3/33 327/184 |
| 5,287,387 A | * | 2/1994 | Birchler | H03K 5/08 332/159 |
| 2005/0168283 A1 | * | 8/2005 | Suzuki | H03F 1/3241 330/149 |
| 2009/0097773 A1 | * | 4/2009 | Nishi | H04N 5/23248 382/264 |
| 2009/0245409 A1 | * | 10/2009 | Kandukuri Narayan | H04W 52/52 375/267 |

* cited by examiner

*Primary Examiner* — Hsinchun Liao
(74) *Attorney, Agent, or Firm* — Malone IP Law; Steven J. Malone

(57) ABSTRACT

A system and method of improving data link performance between two or more wireless data transceivers includes: clipping and inverting the data components of a communication signal which are calculated to cause non-linear saturation effects in the downstream power amplifier; delaying a first time series to align the first time series with the clipped and inverted data components of a second time series; adding the clipped and inverted data components of the second time series to the delayed first time series to obtain a modified composite waveform; creating a sacrificial band containing principal energy of the clipped and inverted data components of the second time series; combining the sacrificial band to the modified composite waveform in non-overlapping signal space to obtain an optimized composite waveform; and amplifying the optimized composite waveform with the downstream power amplifier of one or more of the two or more wireless data transceivers.

20 Claims, 3 Drawing Sheets

SYSTEM AND METHOD FOR IMPROVING WIRELESS DATA LINKS

RELATED APPLICATIONS

This application claims priority to U.S. Provisional Application Ser. No. 62/531,881 titled "High Speed Data Sampling For Filtering, Recreating GPS Signals, and High Speed Communications" filed on Jul. 13, 2017 which is hereby incorporated by reference, in its entirety, for all it teaches and discloses.

FIELD OF THE INVENTION

The present invention discloses a sacrificial band linearization system and method.

BACKGROUND

Amplifiers saturate causing power loss and data loss. The present invention solves the problem of amplifier saturation effects.

SUMMARY

A system and method of improving data link performance between two or more wireless data transceivers includes: combining two or more waveforms to produce a composite waveform; creating a first time series of the composite waveform in parallel to a second time series of the composite waveform; calculating data components of the second time series which will cause non-linear saturation effects when amplified by a downstream power amplifier; clipping and inverting the data components of the second time series which are calculated to cause non-linear saturation effects in the downstream power amplifier; delaying the first time series to align the first time series with the clipped and inverted data components of the second time series; adding the clipped and inverted data components of the second time series to the delayed first time series to obtain a modified composite waveform; creating a sacrificial band containing principal energy of the clipped and inverted data components of the second time series; combining the sacrificial band to the modified composite waveform in non-overlapping signal space to obtain an optimized composite waveform; and amplifying the optimized composite waveform with the downstream power amplifier of one or more of the two or more wireless data transceivers.

The at least one of the two or more waveforms may include encrypted data. The encrypted data may be at least partially formed by a randomized process. The two or more waveforms may include identical data in different channels within the composite waveform. The method may further comprise delaying the modified combined waveform before the step of combining the sacrificial band to the modified composite waveform in non-overlapping signal space. The method the step of adding the clipped and inverted data components of the second time series to the delayed first time series to obtain a modified composite waveform, may modify the composite waveform without knowing or changing any data contained within the two or more waveforms. The step of adding the clipped and inverted data components of the second time series to the delayed first time series to obtain a modified composite waveform, may modify the composite waveform without knowing or changing any encrypted data contained within the two or more waveforms. Each of the two or more waveforms of the optimized composite waveform may be equally amplified by the downstream power amplifier as a result of the optimized composite waveform. The sacrificial band may be amplified by the downstream amplifier without affecting the integrity of the optimized composite waveform. The at least one of the two or more waveforms may be intentionally configured to cause the composite wave form to produce non-linear distortion to a non-compliant downstream amplifier. A communication device that improves data link performance between two or more wireless data transceivers includes: one or more parallel processing blocks including non-transitory firmware configured to: combine two or more waveforms to produce a composite waveform; create a first time series of the composite waveform in parallel to a second time series of the composite waveform; calculate data components of the second time series which will cause non-linear saturation effects when amplified by a downstream power amplifier; clip and invert the data components of the second time series which are calculated to cause non-linear saturation effects; delay the first time series to align the first time series with the clipped and inverted data components of the second time series; combine the clipped and inverted data components of the second time series to the delayed first time series to obtain a modified composite waveform; create a sacrificial band containing principal energy of the clipped and inverted data components of the second time series; combine the sacrificial band to the modified composite waveform in non-overlapping signal space to obtain an optimized composite waveform; and the downstream power amplifier of one or more of the two or more wireless data transceivers amplifying the optimized composite waveform.

The at least one of the two or more waveforms may include encrypted data. The encrypted data may be at least partially formed by a randomized process. All of the two or more waveforms may include identical data in different channels within the composite waveform. The communication device may further comprise delaying the modified combined waveform before the step of combining the sacrificial band to the modified composite waveform in non-overlapping signal space. The step of combining the clipped and inverted data components of the second time series to the delayed first time series to obtain a modified composite waveform, may modify the composite waveform without knowing or changing any data contained within the two or more waveforms. The step of combining the clipped and inverted data components of the second time series to the delayed first time series to obtain a modified composite waveform, may modify the composite waveform without knowing or changing any encrypted data contained within the two or more waveforms. Each of the two or more waveforms of the optimized composite waveform may be equally amplified by the downstream power amplifier as a result of the optimized composite waveform. The sacrificial band may be amplified by the downstream amplifier without affecting the integrity of the optimized composite waveform. The at least one of the two or more waveforms may be intentionally configured to cause the composite wave form to produce non-linear distortion to a non-compliant downstream amplifier.

Sacrificial band linearization has the unique benefit that it is not a pre-distortion algorithm; therefore, it is not burdened by Nth order non-linear memory effects. It is a feed forward technique wherein all signal manipulations are performed in the DSP path prior to the DAC. Conceptually, we are monitoring the continuous sequence of I&Q complex samples; however, we never actually dicker with that primary signal path, but we do report when certain index samples exceed a threshold. Those samples that exceed the threshold will drive the Power-Amplifier into non-linear compression, unless we can do something about it.

We desire to create a complementary inverse signal which would appear precisely when needed to prevent the composite signal from passing that threshold, while not compromising our original waveform. Creating such a signal consists of 1) creating the perfect complement, then 2) capturing its odd order products by passing them through acceptably out-of-band filters-sacrificial filters.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
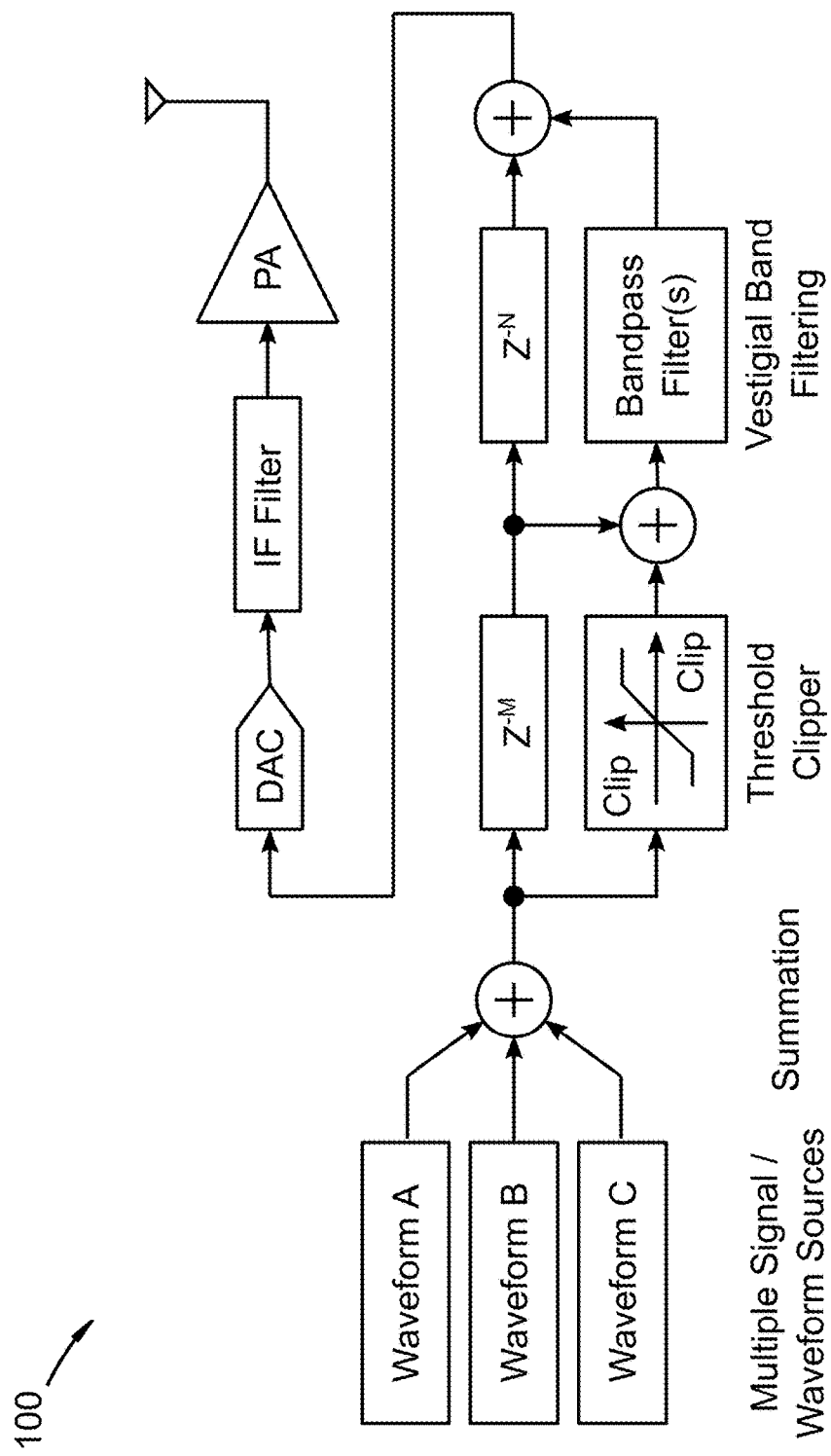
FIG. 1 shows a functional block diagram in accordance with an embodiment of the invention.

FIG. 1 shows a functional block diagram in accordance with an embodiment of the invention. Waveforms A, B, and C are combined into a composite waveform creating a composite waveform which is likely to cause saturation effects in the downstream power amplifier (PA). Waveforms A, B, and C are often randomly encrypted signals with unknown magnitudes and unknown interactions. After the waveforms are combined they are split into a first time series and a second time series. The first time series is delayed by Z-m and the second time series is clipped by the threshold clipper and inverted. The first time series is delayed by an equal delay caused by the threshold clipper and the inversion. The clipped and inverted data components of the second time series are added to the delayed first time series to obtain a modified composite waveform. A sacrificial band, containing principal energy of the clipped and inverted data components of the second time series, is then created and added to the modified composite waveform in an unused non-overlapping signal space creating the sacrificial band. The optimized composite waveform is then amplified by the power amplifier without saturation effects. The sacrificial band energy can be harvested and reused if desired.

Figure 2:
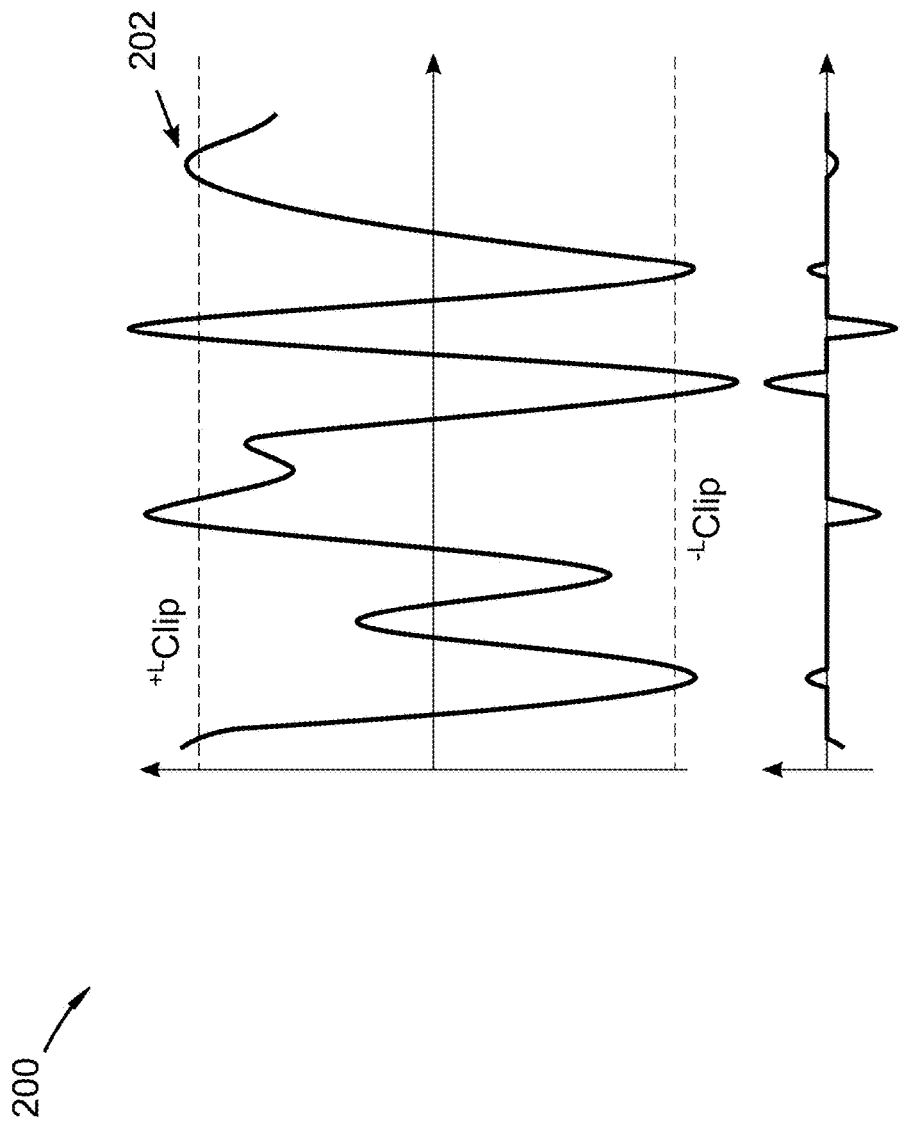
FIG. 2 shows a clipped waveform and complimentary time series in accordance with an embodiment of the invention.

FIG. 2 illustrates the combining of multiple independent waveforms causing saturated outlier spikes 202 (all spike above or below the dotted line), or the momentary power spikes 202. The spikes 202 cause non-linear saturation effects and severe distortions. However, a very clever technique has been developed to cause excess bandwidth to be sacrificed to remove these momentary outliers. FIG. 2 illustrates a common time signal that would drive a PA into a non-linear distortion mode. The signals above and below the L-clip dashed lines are responsible for the distortion. By reducing signal spikes before they are presented to the power amplifier can be achieved by judicious selection of "momentarily opposing dual" (MOD) signals. By allowing certain sacrificial spectral bands to be utilized, we significantly reduce the magnitude of the outliers. An inverted complimentary time series is shown (below) the primary waveform and is created from the threshold level surpassing peaks (above and below the dotted lines). We desire a version of that time series (lower portion) that will reside in non-overlapping signal space creating the sacrificial band.

Sacrificial band linearization has the unique benefit that it is not a pre-distortion algorithm. Techniques implemented to pre-distort signals before they are compressed by the non-linear gain regions (compression regions, P1dB) of a power amplifier work well to the point where the memory effects of the PA become too severe. The wider the bandwidth of the signals, the more severe the memory effects become.

Figure 3:
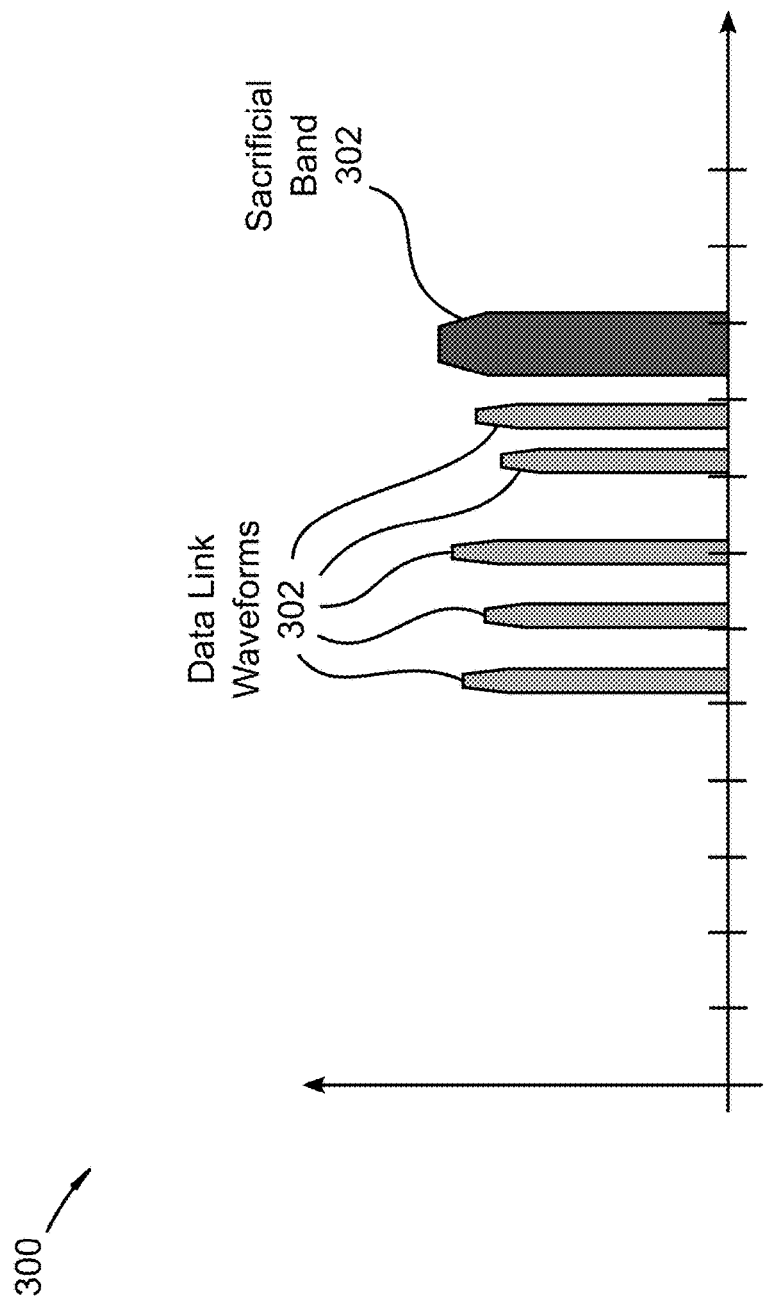
FIG. 3 shows a spectral band including a sacrificial band in accordance with an embodiment of the invention.

FIG. 3, shows a version of the inverted time series of FIG. 2 in non-overlapping signal space creating the sacrificial band 302. Data link waveforms 302 are able to be amplified without any distortion from the power amplifier.

The systems and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of improving data link performance between two or more wireless data transceivers comprising:
   combining two or more waveforms to produce a composite waveform;
   creating a first time series of the composite waveform in parallel to a second time series of the composite waveform;
   calculating data components of the second time series which will cause non-linear saturation effects when amplified by a downstream power amplifier;
   clipping and inverting the data components of the second time series which are calculated to cause non-linear saturation effects in the downstream power amplifier;
   delaying the first time series to align the first time series with the clipped and inverted data components of the second time series;
   adding the clipped and inverted data components of the second time series to the delayed first time series to obtain a modified composite waveform;
   creating a sacrificial band containing principal energy of the clipped and inverted data components of the second time series;
   combining the sacrificial band to the modified composite waveform in non-overlapping signal space to obtain an optimized composite waveform; and amplifying the optimized composite waveform with the downstream power amplifier of one or more of the two or more wireless data transceivers.

2. The method of claim 1, wherein at least one of the two or more waveforms includes encrypted data.

3. The method of claim 2, wherein the encrypted data is at least partially formed by a randomized process.

4. The method of claim 1, wherein all of the two or more waveforms include identical data in different channels within the composite waveform.

5. The method of claim 1 further comprising: delaying the modified combined waveform before the step of combining the sacrificial band to the modified composite waveform in non-overlapping signal space.

6. The method of claim 1, wherein the step of adding the clipped and inverted data components of the second time series to the delayed first time series to obtain a modified composite waveform, modifies the composite waveform without knowing or changing any data contained within the two or more waveforms.

7. The method of claim 3, wherein the step of adding the clipped and inverted data components of the second time series to the delayed first time series to obtain a modified composite waveform, modifies the composite waveform without knowing or changing any encrypted data contained within the two or more waveforms.

8. The method of claim 1, wherein each of the two or more waveforms of the optimized composite waveform are equally amplified by the downstream power amplifier as a result of the optimized composite waveform.

9. The method of claim 1, wherein the sacrificial band is amplified by the downstream amplifier without affecting the integrity of the optimized composite waveform.

10. The method of claim 1, wherein at least one of the two or more waveforms are intentionally configured to cause the composite wave form to produce non-linear distortion to a non-compliant downstream amplifier.

11. A communication device that improves data link performance between two or more wireless data transceivers comprising:
   a. one or more parallel processing blocks including non-transitory firmware configured to:
      i. combine two or more waveforms to produce a composite waveform;
      ii. create a first time series of the composite waveform in parallel to a second time series of the composite waveform;
      iii. calculate data components of the second time series which will cause non-linear saturation effects when amplified by a downstream power amplifier;
      iv. clip and invert the data components of the second time series which are calculated to cause non-linear saturation effects;
      v. delay the first time series to align the first time series with the clipped and inverted data components of the second time series;
      vi. combine the clipped and inverted data components of the second time series to the delayed first time series to obtain a modified composite waveform;
      vii. create a sacrificial band containing principal energy of the clipped and inverted data components of the second time series;
      viii. combine the sacrificial band to the modified composite waveform in non-overlapping signal space to obtain an optimized composite waveform; and
   b. the downstream power amplifier of one or more of the two or more wireless data transceivers amplifying the optimized composite waveform.

12. The communication device of claim 11, wherein at least one of the two or more waveforms includes encrypted data.

13. The communication device of claim 12, wherein the encrypted data is at least partially formed by a randomized process.

14. The communication device of claim 11, wherein all of the two or more waveforms include identical data in different channels within the composite waveform.

15. The communication device of claim 11 further comprising: delaying the modified combined waveform before the step of combining the sacrificial band to the modified composite waveform in non-overlapping signal space.

16. The communication device of claim 11, wherein the step of combining the clipped and inverted data components of the second time series to the delayed first time series to obtain a modified composite waveform, modifies the composite waveform without knowing or changing any data contained within the two or more waveforms.

17. The communication device of claim 13, wherein the step of combining the clipped and inverted data components of the second time series to the delayed first time series to obtain a modified composite waveform, modifies the composite waveform without knowing or changing any encrypted data contained within the two or more waveforms.

18. The communication device of claim 11, wherein each of the two or more waveforms of the optimized composite waveform are equally amplified by the downstream power amplifier as a result of the optimized composite waveform.

19. The communication device of claim 11, wherein the sacrificial band is amplified by the downstream amplifier without affecting the integrity of the optimized composite waveform.

20. The communication device of claim 11, wherein at least one of the two or more waveforms are intentionally configured to cause the composite wave form to produce non-linear distortion to a non-compliant downstream amplifier.

* * * * *